United States Patent
McPherson

(10) Patent No.: US 9,360,271 B1
(45) Date of Patent: Jun. 7, 2016

(54) VIBRATION DAMPER

(71) Applicant: MCP IP, LLC, Sparta, WI (US)

(72) Inventor: Mathew A. McPherson, Norwalk, WI (US)

(73) Assignee: MCP IP, LLC, Sparta, WI (US)

( * ) Notice: Subject to any disclaimer, the term of this patent is extended or adjusted under 35 U.S.C. 154(b) by 537 days.

(21) Appl. No.: 13/828,014

(22) Filed: Mar. 14, 2013

(51) Int. Cl.
*F41C 23/06* (2006.01)
*F16F 7/108* (2006.01)

(52) U.S. Cl.
CPC .................. *F41C 23/06* (2013.01); *F16F 7/108* (2013.01)

(58) Field of Classification Search
CPC ........ F41C 23/06; F41C 27/22; F16F 77/108; F41B 11/73; F41A 23/08; F41A 3/84
USPC ...................... 42/74, 1.06, 71.02, 97; 89/14.3; 188/378, 379
See application file for complete search history.

(56) References Cited

U.S. PATENT DOCUMENTS

| | | | |
|---|---|---|---|
| 2,411,550 A | 11/1946 | Lynn et al. | |
| 2,928,444 A | 3/1960 | Ivins | |
| 3,232,597 A | 2/1966 | Gaydecki | |
| 3,381,405 A | 5/1968 | Edwards | |
| 3,489,052 A | 1/1970 | Colyer et al. | |
| 3,674,267 A | 7/1972 | Hollis | |
| 3,751,024 A | 8/1973 | Pineau | |
| 4,109,404 A | 8/1978 | Preeschl | |
| 4,156,979 A | 6/1979 | Katsenes | |
| 4,240,479 A | 12/1980 | Schleffendorf | |
| 4,262,977 A * | 4/1981 | Bock .................. | F16F 15/1442 384/202 |
| 4,276,947 A | 7/1981 | Hebel | |
| 4,347,717 A | 9/1982 | Lamarche | |
| 4,395,809 A * | 8/1983 | Whiteley ............ | F16F 15/1442 188/378 |
| 4,558,852 A * | 12/1985 | Steiner .................... | F16F 7/108 188/380 |
| 4,623,049 A | 11/1986 | Warren | |
| 4,645,044 A | 2/1987 | Kato et al. | |
| 4,691,926 A | 9/1987 | Adam | |
| 4,697,481 A | 10/1987 | Maeda | |
| 4,907,810 A | 3/1990 | Whiteford | |

(Continued)

FOREIGN PATENT DOCUMENTS

| | | |
|---|---|---|
| JP | 401008044 | 1/1989 |
| JP | 2003081168 | 3/2003 |
| KR | 2004041292 | 5/2004 |

OTHER PUBLICATIONS

FASST Company internet product literature/brochure entitled, "Anti-Vibration Bar Inserts for Motorcycles", pp. 1-3, dated Sep. 12, 2005, printed from www.fasstco.com.

(Continued)

*Primary Examiner* — Joshua Freeman
*Assistant Examiner* — Bridget Cochran

(57) ABSTRACT

In at least one embodiment, a firearm comprises a stock comprising a vibration damper. The vibration damper comprises a first resilient member, a second resilient member and a mass. Each resilient member is attached to the stock and comprises a first material and a second material. Each of the first and second materials is elastomeric. The first material defines a body of the resilient member, the body defining apertures therein and spokes extending between adjacent apertures. The second material of each resilient member occupying an entire cross-section of each aperture defined in the first material of the resilient member. The mass is supported by said first and second resilient members.

14 Claims, 7 Drawing Sheets

(56) References Cited

U.S. PATENT DOCUMENTS

| | | | |
|---|---|---|---|
| 4,913,031 A * | 4/1990 | Bossard | F41C 27/22 |
| | | | 42/1.06 |
| 4,927,143 A | 5/1990 | Hillock | |
| 4,948,131 A | 8/1990 | Nakanishi | |
| 5,004,215 A | 4/1991 | Aubry et al. | |
| 5,052,500 A | 10/1991 | Ohtsu | |
| 5,087,491 A | 2/1992 | Barrett | |
| 5,088,734 A | 2/1992 | Glava | |
| 5,180,039 A | 1/1993 | Axthammer et al. | |
| 5,180,147 A | 1/1993 | Andersson et al. | |
| 5,211,669 A | 5/1993 | Bonnes et al. | |
| 5,253,544 A | 10/1993 | Allsop et al. | |
| 5,256,969 A | 10/1993 | Miyajima et al. | |
| 5,257,680 A | 11/1993 | Corcoran et al. | |
| 5,269,516 A | 12/1993 | Janes | |
| 5,273,022 A | 12/1993 | Leven | |
| 5,285,697 A | 2/1994 | Clausen | |
| 5,295,684 A | 3/1994 | Bracho | |
| 5,441,132 A | 8/1995 | Pradel et al. | |
| 5,454,573 A | 10/1995 | Nijland | |
| 5,491,390 A | 2/1996 | McGreen | |
| 5,505,118 A | 4/1996 | Arnesen et al. | |
| 5,511,444 A | 4/1996 | Clausen et al. | |
| 5,513,730 A | 5/1996 | Petrovich et al. | |
| 5,655,980 A | 8/1997 | Nashif et al. | |
| 5,669,835 A | 9/1997 | Tiura | |
| 5,690,566 A | 11/1997 | Bracho | |
| 5,704,259 A | 1/1998 | Riehle | |
| 5,809,982 A * | 9/1998 | McPherson | F41B 5/10 |
| | | | 124/25.6 |
| 5,827,992 A | 10/1998 | Harris et al. | |
| 5,857,694 A | 1/1999 | Lazarus et al. | |
| 5,884,892 A | 3/1999 | Gassen et al. | |
| 5,931,748 A | 8/1999 | Hsieh | |
| 5,944,617 A | 8/1999 | Falone et al. | |
| 5,964,672 A | 10/1999 | Bianchi | |
| 5,984,233 A * | 11/1999 | Snyder, Jr. | F16F 7/108 |
| | | | 188/379 |
| 6,007,439 A | 12/1999 | MacKay, Jr. | |
| 6,026,910 A | 2/2000 | Masterson et al. | |
| 6,039,035 A * | 3/2000 | McPherson | F41B 5/10 |
| | | | 124/25.6 |
| 6,070,301 A | 6/2000 | Fallandy | |
| 6,117,028 A | 9/2000 | You | |
| 6,149,475 A | 11/2000 | Tasaka et al. | |
| 6,149,538 A | 11/2000 | Tiura | |
| 6,182,301 B1 | 2/2001 | Krueger et al. | |
| 6,240,642 B1 | 6/2001 | Templeton | |
| 6,247,687 B1 | 6/2001 | Jensen et al. | |
| 6,257,219 B1 * | 7/2001 | McPherson | F41B 5/10 |
| | | | 124/25.6 |
| 6,257,220 B1 | 7/2001 | McPherson et al. | |
| 6,382,201 B1 * | 5/2002 | McPherson | F41B 5/0005 |
| | | | 124/23.1 |
| 6,499,187 B2 | 12/2002 | Hollingsworth | |
| 6,508,343 B2 | 1/2003 | Misaji et al. | |
| 6,548,007 B1 | 4/2003 | Deloris et al. | |
| 6,668,681 B2 | 12/2003 | Flum et al. | |
| 6,687,955 B2 | 2/2004 | Hollingsworth | |
| 6,709,352 B1 | 3/2004 | Albin | |
| 6,725,985 B2 | 4/2004 | Haneishi et al. | |
| 6,763,747 B1 | 7/2004 | Gierer et al. | |
| 6,837,345 B1 | 1/2005 | Lauble et al. | |
| 6,978,643 B2 | 12/2005 | Akers et al. | |
| 6,989,197 B2 | 1/2006 | Schneider | |
| 7,055,276 B2 * | 6/2006 | McPherson | F41C 27/22 |
| | | | 188/381 |
| 7,264,098 B2 | 9/2007 | McPherson | |
| 7,578,465 B2 | 8/2009 | Bachmeyer et al. | |
| 7,987,954 B2 * | 8/2011 | McPherson | F16F 7/108 |
| | | | 188/379 |
| 2002/0006523 A1 | 1/2002 | Obeshaw | |
| 2002/0170378 A1 | 11/2002 | Flum et al. | |
| 2002/0193168 A1 | 12/2002 | Hosooka et al. | |
| 2003/0177746 A1 | 9/2003 | Goman et al. | |
| 2003/0226421 A1 | 12/2003 | Livingston | |
| 2003/0229970 A1 | 12/2003 | Chen | |
| 2005/0279598 A1 | 12/2005 | McPherson | |
| 2005/0279599 A1 * | 12/2005 | McPherson | F16F 7/108 |
| | | | 188/379 |
| 2007/0267924 A1 | 11/2007 | Dellinger | |
| 2010/0224178 A1 * | 9/2010 | McPherson | F41B 5/1426 |
| | | | 124/25.6 |

OTHER PUBLICATIONS

FASST Company internet product literature/brochure entitled, "Project Honda CRF450-Installation of Fasst Company's Anti-Vibration Inserts-Off-Road com's Ride-Net!", pp. 1-4, dated Sep. 12, 2005, printed from www.fasstco.com.

* cited by examiner

VIBRATION DAMPER

BACKGROUND OF THE INVENTION

This invention is related to a vibration damper that may be used to reduce vibrations or noises present in a handheld device. Some examples of handheld devices are devices firing projectiles, such as some firearms, archery bows and the like. Handheld devices may also be striking devices, sporting equipment, tools and motorized equipment such as power tools, lawn equipment, etc. The concept in this invention can also be used in transportation devices and other rolling and/or motorized devices, such as bicycles, wagons, motorcycles, jet skis, lawn mowers, snow-blowers, snowmobiles, all-terrain vehicles and the like.

Firearms can fire a projectile using a propellant, such as an explosive charge or a compressed gas. Examples of firearms include rifles, pistols, and machine guns. Even tanks and howitzers may be considered firearms. Upon firing a projectile, a firearm will generally experience an initial recoil and various residual vibrations. Residual vibrations may be present throughout the firearm as a whole, and further, more individualized vibrations may be present within individual components, such as the stock and the barrel, as each part may vibrate and/or resonate at certain frequencies.

An archery bow is a mechanical device used to store energy derived from the archer during the drawing of the bowstring and then when the archer looses the bowstring the energy is rapidly released. A great portion of this energy goes into the launching of the arrow, and most of the remainder finds its way back into the bow resulting in noise or being lost in the transfer process. Energy remaining in the bow immediately after firing can be felt as hand shock and system vibration.

Other examples of handheld devices are baseball bats, cricket bats, golf clubs, hockey sticks, tennis rackets, squash rackets, racquetball rackets, badminton rackets, table tennis paddles, croquet mallets, polo sticks, lacrosse sticks, oars, pool cues, nightsticks, hammers, axes, picks, saws, files, rasps, punches, chisels and rachets. Handheld devices can generate various vibrations during normal use. For example, vibrations may be generated by striking another object. These vibrations may be uncomfortable and may even cause injury.

Transportation devices may be subject to various vibrations and noises which may be present throughout the structures of the devices. Vibrations generated by a transportation device may pass through a control device or grip such as a handle, and also through a seat or other supporting apparatuses in cases where the transportation device supports an operator or passengers.

It would be desirable to damp the vibrations or noises present in the devices described above.

U.S. Pat. Nos. 6,257,220 and 6,382,201 to McPherson et al discussing vibration dampers as applied to archery bows, and U.S. Pat. Nos. 7,264,098 and 7,055,276 to McPherson discussing vibration damper as applied to handheld devices and firearms respectively are incorporated herein by reference in their entireties. U.S. patent application Ser. No. 29/438,218 is hereby incorporated herein by reference.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In at least one embodiment, a vibration damper comprises a resilient member and a mass supported by the resilient member. The mass comprises a first weight, a resilient portion and an inner weight. The resilient portion suspends the inner weight with respect to the first weight.

In at least one embodiment, a firearm comprises a stock comprising a vibration damper. The vibration damper comprises a first resilient member, a second resilient member and a mass. Each resilient member is attached to the stock and comprises a first material and a second material. Each of the first and second materials is elastomeric. The first material defines a body of the resilient member, the body defining apertures therein and spokes extending between adjacent apertures. The second material of each resilient member occupying an entire cross-section of each aperture defined in the first material of the resilient member. The mass is supported by said first and second resilient members.

In some embodiments, the mass comprises a first weight, a resilient portion and a second weight.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
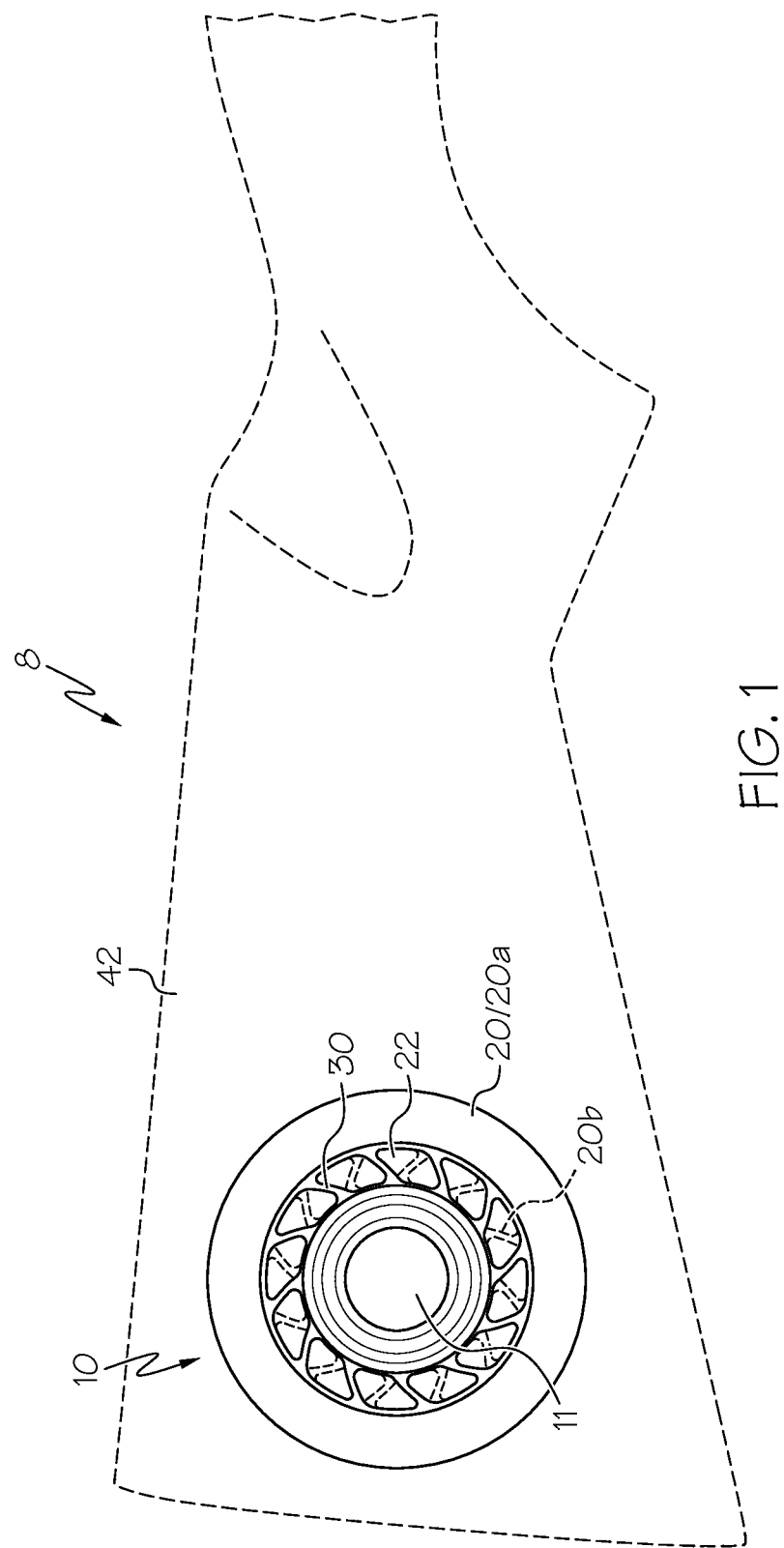
FIG. 1 shows an embodiment of a vibration damper mounted in a rifle stock.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIG. 1 shows a portion of an object 8 having a vibration damper 10. In some embodiments, the object 8 comprises a firearm. FIG. 1 shows the vibration damper 10 mounted in a firearm stock 42. Desirably, the vibration damper 10 comprises a mass 11 that is suspended from the object 8 by a resilient member 20 that comprises an elastic material such as rubber, an elastomeric polymer, etc.

Figure 2:
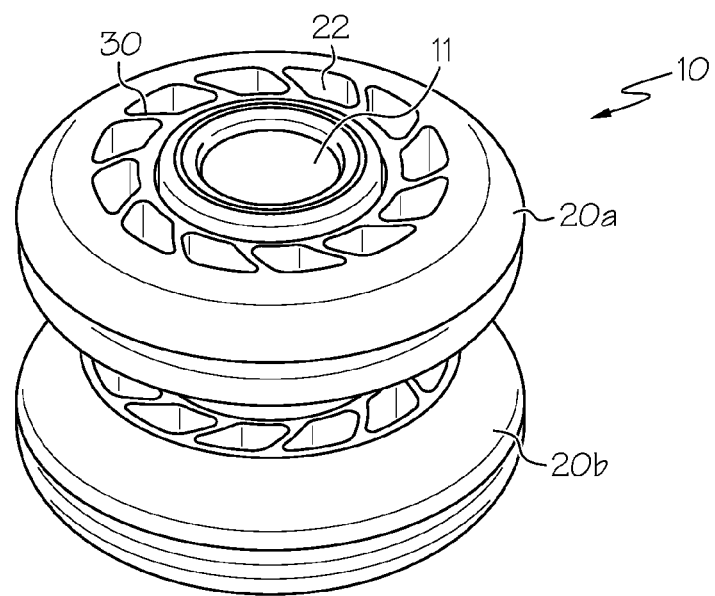
FIG. 2 shows an angled view of an embodiment of a vibration damper.
Figure 3:
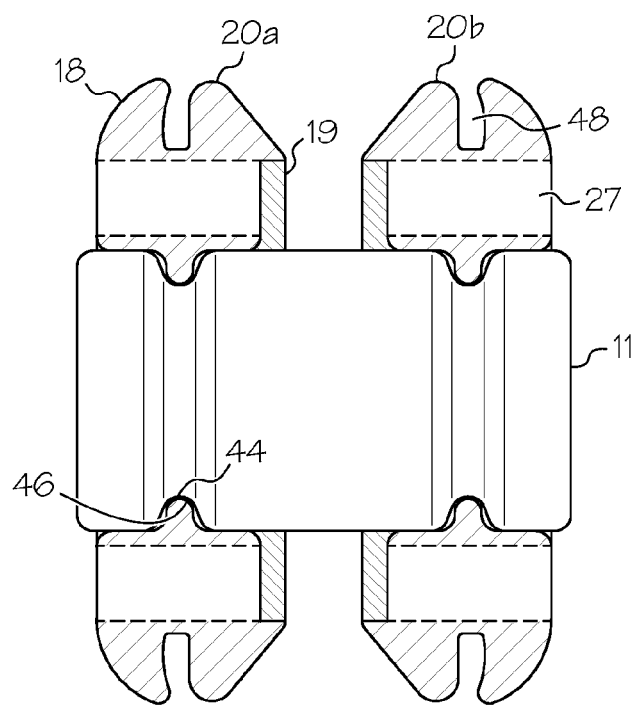
FIG. 3 shows a side view of an embodiment of a vibration damper.

In some embodiments, for example as shown in FIGS. 2 and 3, a vibration damper 10 comprises a first resilient member 20a and a second resilient member 20b, which are both arranged to support the mass 11. Each resilient member 20a, 20b may engage a different portion of the mass 11 and a different portion of the object 8. In a firearm stock 42, the resilient members 20a, 20b can each engage a respective side of the stock 42. In some embodiments, the second resilient member 20b is a mirror image of the first resilient member 20a.

A resilient member 20 can include one or more apertures 22. The location, size and shape of the apertures 22 in the resilient member 20 impact the performance characteristics of the damper 10. Apertures 22 may extend through an entire depth of the resilient member 20. Alternatively, a resilient member 20 may include cavities 27 (see e.g. FIG. 3), which are similar to apertures 22 but do not extend through the entire depth of the resilient member 20. A number of spokes 30 can be defined in the resilient member 20 between the apertures 22 or cavities 27. The length, width and thickness of the spokes 30 may be varied to achieve desired damping characteristics.

In some embodiments, the spokes 30 are oriented in a radial direction of the resilient member 20. In some embodiments, each spoke 30 is angled with respect to a radial direction. FIGS. 1 and 2 show an embodiment wherein a first resilient member 20a comprises spokes 30 angled in a first direction, and a second resilient member 20b having a similar configuration but opposite orientation—for example, the second resilient member 20b is flipped 180 degrees when compared to the first resilient member 20a. As shown in FIG. 1, in some embodiments, the spokes 30 of the second resilient member 20b are visible through the apertures 22 of the first resilient member 20a.

In some embodiments, each aperture 22 or cavity 27 has a similar same size and shape. In some embodiments, each spoke 30 has a similar size and shape.

With reference to FIG. 3, in some embodiments, a resilient member 20 comprises a first material 18 and a second material 19. In some embodiments, the first material 18 forms a circumferential body and the spokes 30, and apertures 22 extend through an entire depth of the first material 18. The second material 19 is positioned to block the apertures 22, for example blocking an end of the aperture 22 or extending into the aperture 22. In some embodiments, although apertures 22 are formed in the first material 18, the orientation of the second material 19 results in the resilient member 20 having cavities 27. In some embodiments, the second material 19 is provided as a thin layer. In some embodiments, the second material 19 is positioned at an "inner" portion of the resilient member 20 (e.g. close to a centroid of the damper 10). When a vibration damper 10 comprises a first resilient member 20a and a second resilient member 20b, the second material 19 of each resilient member 20a, 20b can be positioned toward an inner portion of the vibration damper 10. This minimizes the visibility of the second material 19. In some embodiments, the second material 19 is clear or colorless, further minimizing its visibility. This allows the vibration damper 10 to have a fluid-tight seal with the object 8, while appearing to have openings/apertures 22. When used in a gun stock 42, resilient members 20 comprising a second material 19 can create the appearance of a damper with apertures, but the gun stock will remain sealed.

As shown in FIG. 3, in some embodiments, the first material 18 can be formed having a space/cavity for the second material 19, and the second material 19 can be oriented flush with a surface of the first material 18. In some embodiments, the second material 19 is ring-shaped or disk-shaped.

In some embodiments, the resilient member(s) 20 comprise mating a feature 46, such as a ridge or groove, which engages a complimentary mating feature 44 (e.g. corresponding ridge or groove) in the mass 11. In some embodiments, the resilient member(s) 20 comprise a device engaging portion 12, such as a groove or ridge, which is arranged to engage the object 8. In various embodiments, a resilient member 20 can be attached to an object 8 using any suitable method.

In some embodiments, a vibration damper 10 comprises a mass 11 that comprises at least one additional resilient member that suspends at least one additional weight.

Figure 4:
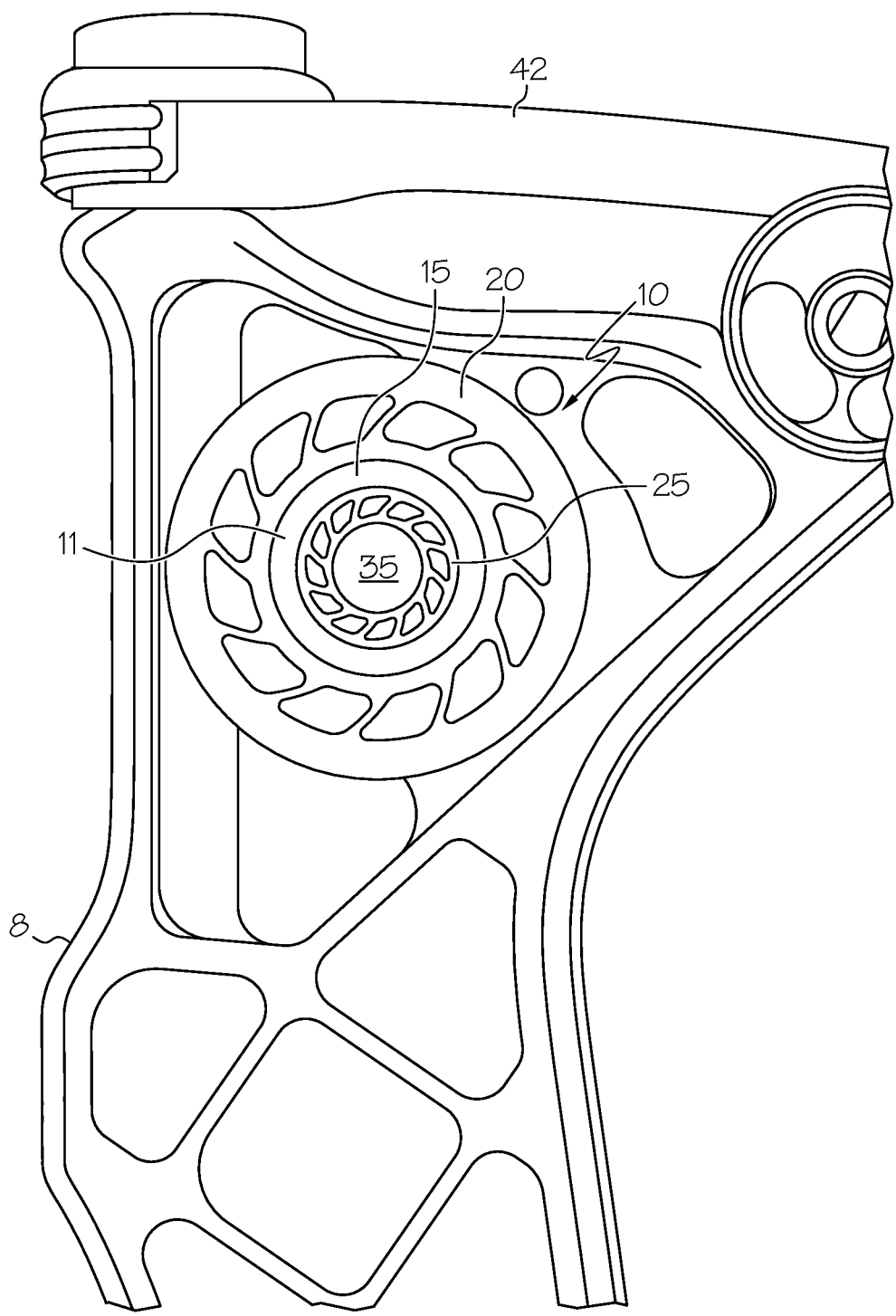
FIG. 4 an embodiment of a vibration damper mounted in a bow riser.
Figure 5:
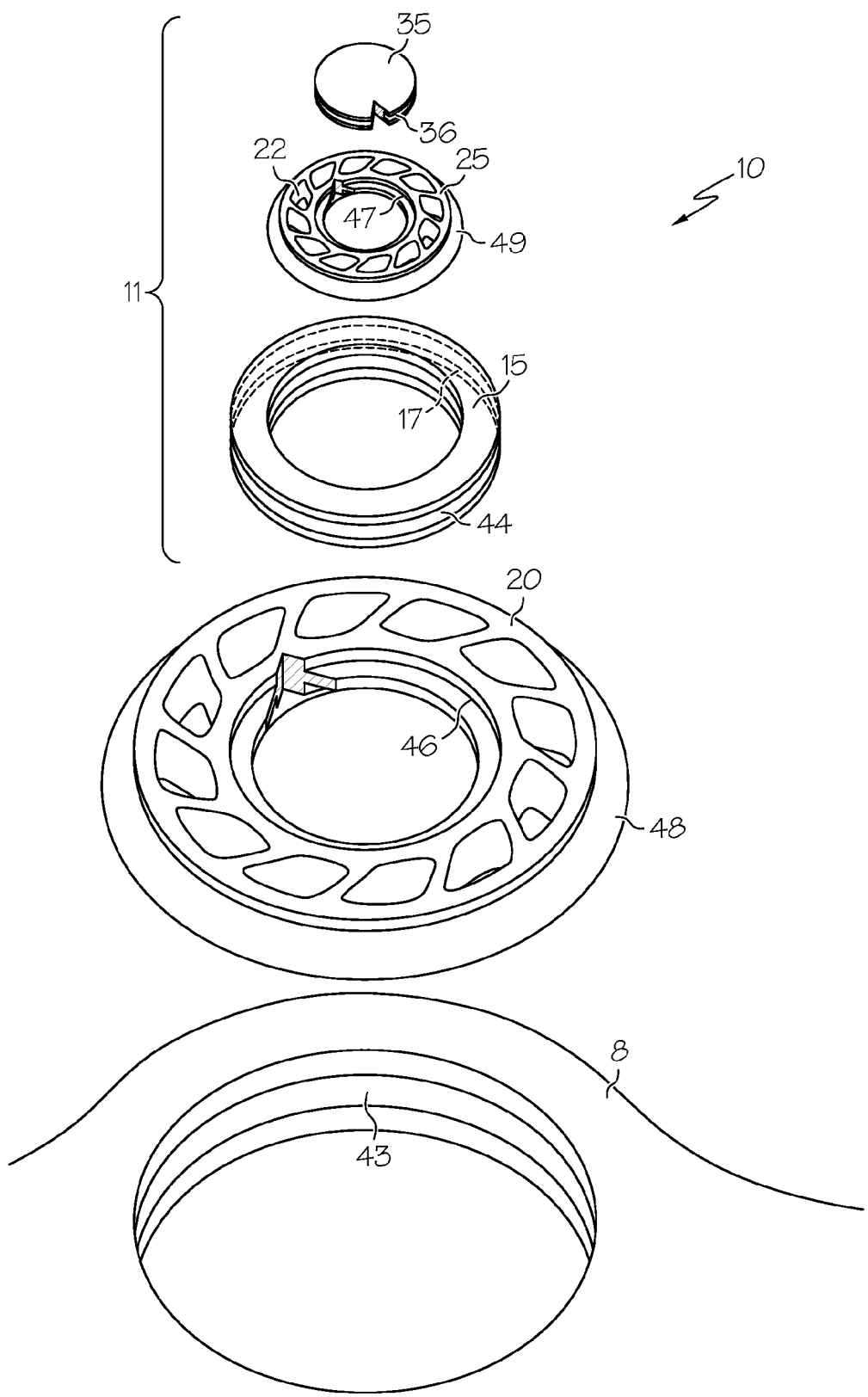
FIG. 5 shows an exploded view of the vibration damper of FIG. 4.

FIG. 4 shows an embodiment of a vibration damper 10 in an object 8 such as an archery bow riser. FIG. 5 shows an exploded view of the vibration damper 10 of FIG. 4. In some embodiments a vibration damper 10 comprises a resilient member 20 arranged to support a mass 11, and the mass 11 comprises a first weight 15, a resilient portion 25, and an inner weight 35. Desirably, the inner weight 35 is suspended with respect to the first weight 15 by the resilient portion 25. In some embodiments, the inner weight 35 is entirely supported by the inner resilient portion 25. In some embodiments, the inner resilient portion 25 is entirely supported by the first weight 15.

As shown in FIG. 5, the resilient member 20 comprises a device engaging portion 48, which is configured to engage a portion 43 (e.g. groove) of the device 8. In some embodiments, the vibration damper 10 is entirely supported by the engagement. In some embodiments, the device engaging portion 48 comprises a mating ridge, which is configured to be received and retained by a mating groove of the portion 43. In some embodiments, the device engaging portion 48 may comprise a cavity or a depression. In some embodiments, the cavity may be a through hole. It should be noted that the structure depicted in the Figure is merely an example of configuration which may be used to engage the vibration damper 10 and the device 8. The configuration shown and described here is preferred because it allows a user to remove and replace the various components as desired, while the vibration damper is retained and entirely supported by the device during its normal operation. Any suitable means known to one of ordinary skill in the art may be used. Some suitable means include permanent or temporary adhesive or frictional engagement, which can be found in U.S. Pat. Nos. 6,257,220, 7,055,276 and 7,264,098.

The resilient member 20 comprises a mass engaging portion 46 that is configured to engage a mass 11, such as a first weight 15. In some embodiments, the weight engaging portion 46 is generally surrounded by the device engaging portion 48 and is configured for receiving the mass 11. In some embodiments, the weight engaging portion 46 may comprise a cavity or a depression. In some embodiments, the cavity may be a through hole. In some embodiments, the mass 11 is entirely supported by the resilient member 20. The weight engaging portion 46 may comprise a mating ridge, which is configured to be received and retained by a complimentary mating groove of a first engaging portion 44 of the first weight 15. Other suitable means of engagement known by one of ordinary skill in the art may be used.

In some embodiments, the first weight 15 comprises a second engaging portion 17 that is configured to engage the resilient portion 25. The second engaging portion 17 may comprise a mating groove, which is configured to receive and retain a mating ridge of the first engaging portion 49 of the inner resilient portion 25. Other suitable means of engagement known by one of ordinary skill in the art may be used.

In some embodiments, the resilient portion 25 comprises a first engaging portion 49 arranged to engage the first weight 15, and a second engaging portion 47 that is configured to engage the inner weight 35. In some embodiments, the resilient portion 25 comprises apertures 22 or cavities 27. In some embodiments, the resilient portion 25 is similar in appearance to a resilient member 20 but smaller in size. In some embodiments, the inner weight 35 is entirely supported by the resilient portion 25.

In some embodiments, the inner weight 35 comprises an engaging portion 36 arranged to engage a portion of the resilient portion 25, such as a first engaging portion 49.

Figure 6:
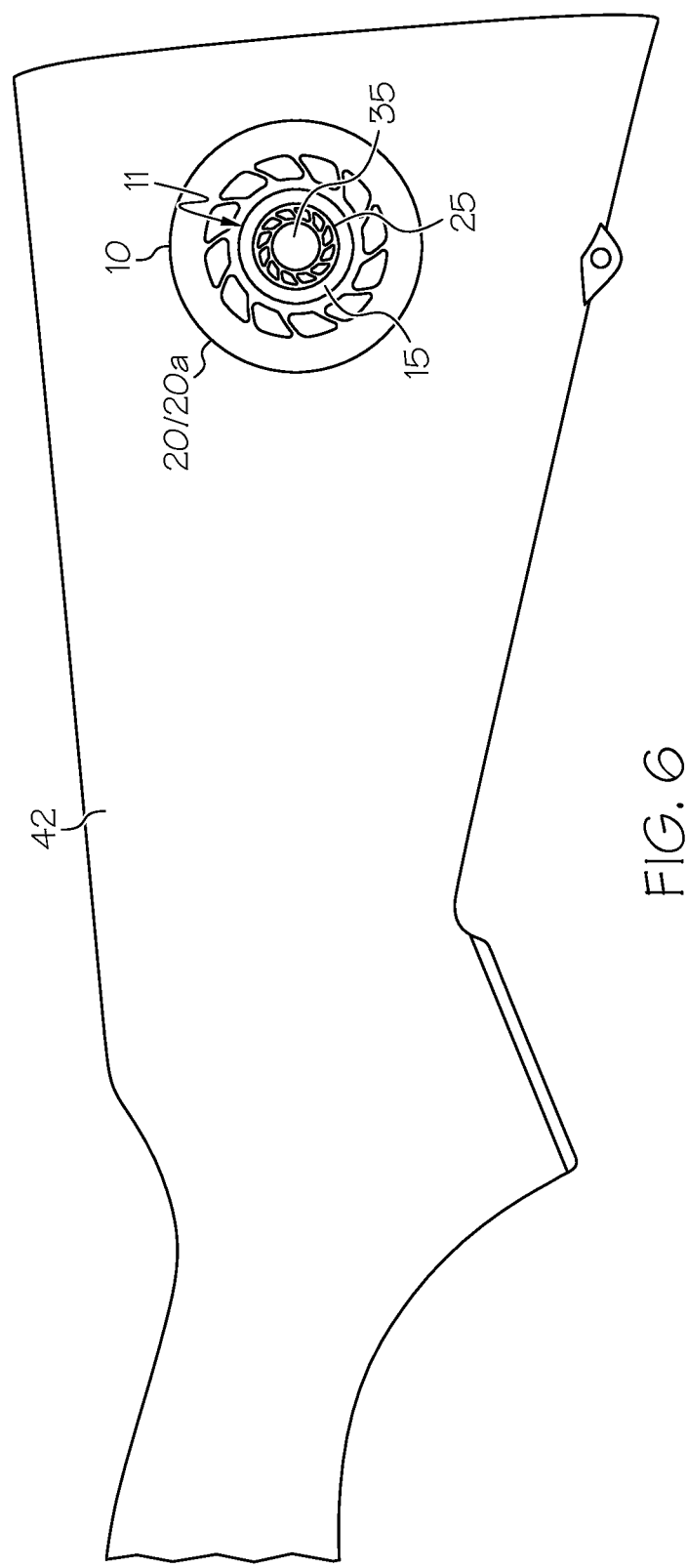
FIG. 6 shows an embodiment of a vibration damper mounted in a rifle stock.

FIG. 6 shows an embodiment of a gun stock 42 having a vibration damper 10 comprising a mass 11, wherein the first mass 11 comprises a first weight 15, a resilient portion 25 and an inner weight 35. The vibration damper 10 of FIG. 6 comprises a first resilient member 20a and a second resilient member 20b, although the second resilient member 20b is not visible in FIG. 6.

Figure 7:
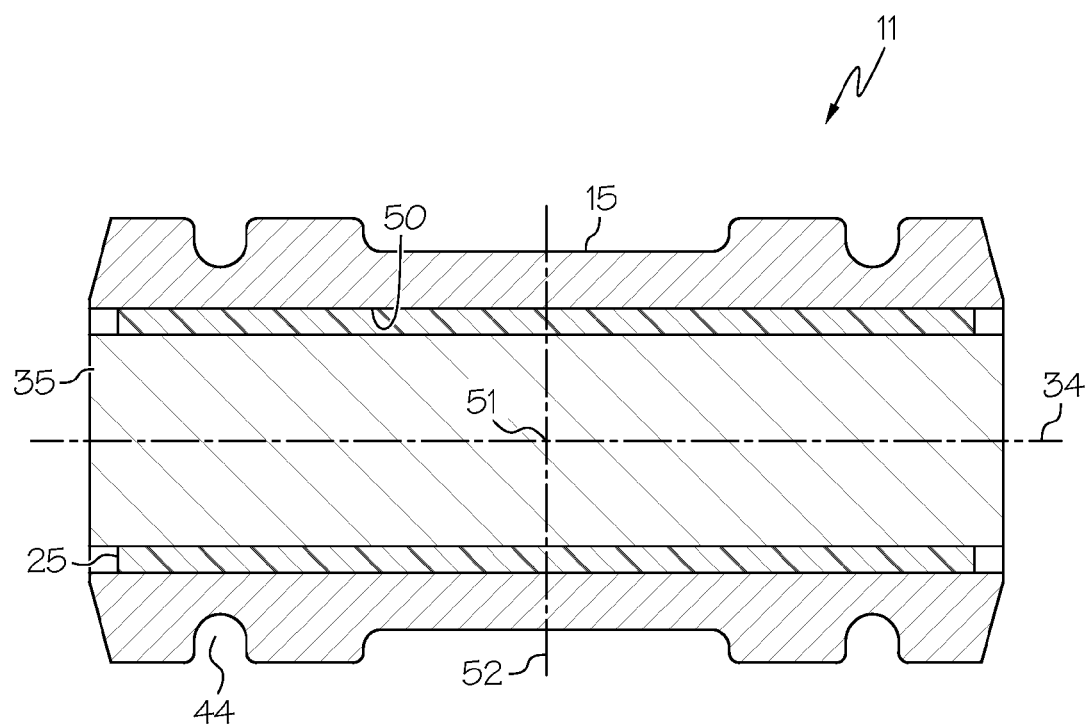
FIG. 7 shows a longitudinal cross-section of an embodiment of a mass.
Figure 8:
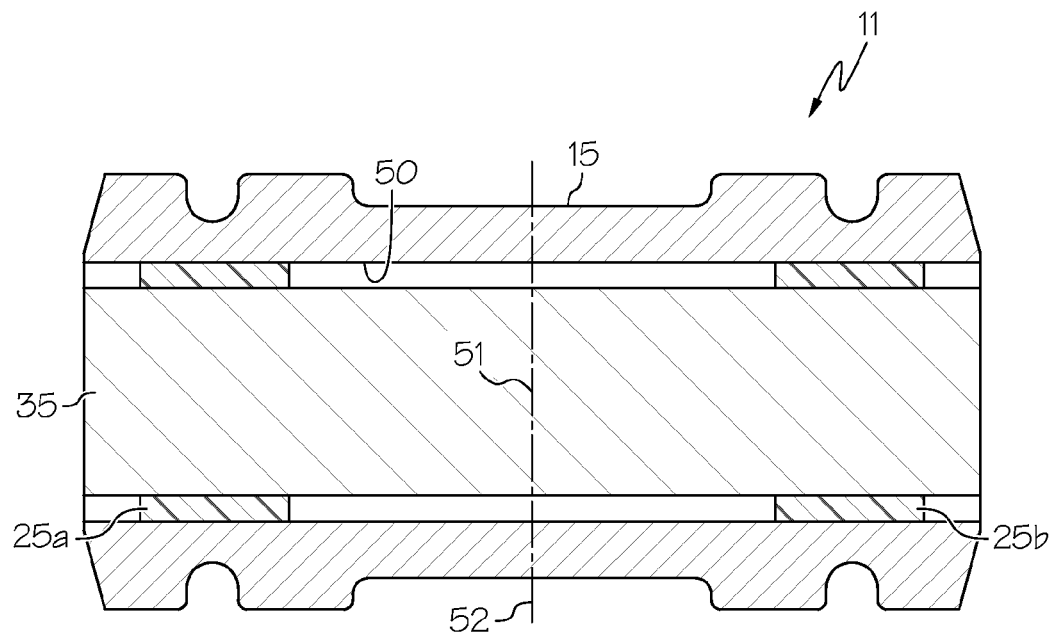
FIG. 8 shows a longitudinal cross-section of another embodiment of a mass.
Figure 9:
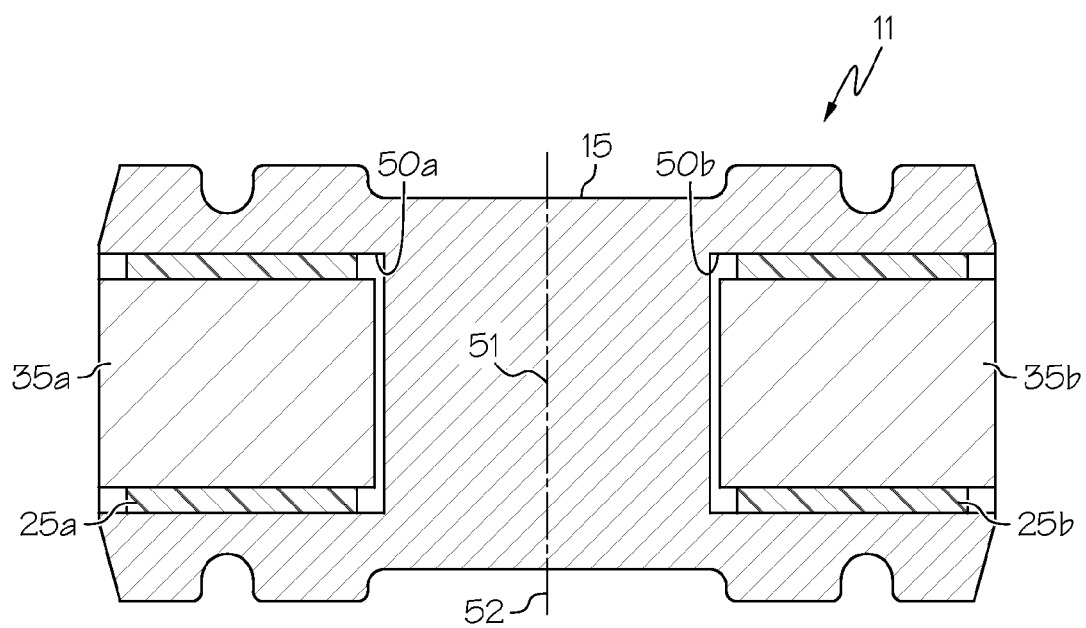
FIG. 9 shows a longitudinal cross-section of another embodiment of a mass.

FIGS. 7-9 show longitudinal cross sections of three embodiments of the mass 11. The mass 11 generally comprises an outer weight 15 having a cavity 50, an inner resilient portion 25 and an inner weight 35. The cavity 50 may be a through hole, as shown in FIG. 7. In some embodiments, at least some portion of the cavity 50 engages an inner resilient portion 25

The outer weight 15 has a centroid 51 and a central axis 34. In some embodiments, the outer weight 15 is symmetrical across a plane 52 that bisects the outer weight. In some embodiments, the centroid 51 is located in the plane 52. In some embodiments, the plane 52 is orthogonal to the central axis 34.

In some embodiments, the inner resilient portion 25 comprises apertures 22, or cavities 27, and spokes 30.

Desirably, the inner resilient portion 25 suspends the inner weight 35 with respect to the outer weight 15.

In some embodiments, the mass 11 comprises more than one resilient portion, such as a first resilient portion 25a and second resilient portion 25b, for example as shown in FIG. 8. Each resilient portion 25a, 25b may engage a different portion of the cavity 50, and a different portion of an inner weight 35. In some embodiments, the inner weight 35 is entirely supported by the collective resilient portions 25a, 25b. In some embodiments, the first resilient portion 25a is symmetrical with the second resilient portion 25b across a bisecting plane 52.

In some embodiments, the outer weight 15 comprises multiple cavities, such as a first cavity 50a and a second cavity 50b, for example as shown in FIG. 9. In some embodiments, a first resilient portion 25a is oriented in the first cavity 50a and supports a first inner weight 35a. In some embodiments, a second resilient portion 25b is oriented in the second cavity 50b and supports a second inner weight 35b. In some embodiments, the first resilient portion 25a is symmetrical with the second resilient portion 25b across a bisecting plane 52. In some embodiments, the first inner weight 35a is symmetrical with the second inner weight 35b across a bisecting plane 52.

The shape of the vibration damper 10 may be varied to allow optimum performance and placement in a given available space. The vibration damper 10 can be round, oval, square or any other suitable shapes. In some devices, a plurality of vibration dampers may be mounted to allow optimum performance. Each vibration damper may have different configurations, including sizes and shapes.

The weight portions of the vibration damper 10, such as outer weight 15 and inner weight 35, can be formed from any suitable materials and is desirably a fairly dense metal such as tungsten, lead, steel, brass, aluminum, various alloys and combinations thereof. In some embodiments, a weight 15, 35 can be formed from non-metals such as stone, ceramic, polymers, plastics, rubbers and the like. Desirably, the material(s) used to form a weight 15, 35 has a higher density than materials used to form resilient members/portions of the damper 10. In some embodiments, the outer weight 15 and the inner weight 35 may be made from the same materials. In some embodiments, an outer weight 15 comprises a different material from an inner weight 15.

The resilient member(s) 20 and resilient portion(s) 25 desirably have a greater elasticity than the outer weight 15 and/or the inner weight 35. In some embodiments, a resilient member 20 and/or a resilient portion 25 comprises an elastic or elastomeric material, and may be configured in whole or in part from a variety of materials including Anylin®, Santoprene®, rubber, plastic, and the like. In some embodiments, a resilient member 20 is made from the same material as a resilient portion 25. In some embodiments, a resilient member 20 and a resilient portion 25 are made from different materials. Portions of a resilient member 20 desired to be clear or colorless, such as a second material 19 (see FIG. 3) can be formed from a polyurethane or any other suitable material.

In some embodiments, a central axis of an outer weight 15 and a central axis of an inner weight 35 are coaxial. In some other embodiments, the central axis of an outer weight 15 and the central axis of an inner weight 35 are parallel but not coaxial. In some embodiments, the central axis of an outer weight 15 and the central axis of an inner weight 35 are oriented at a non-zero angle. The central axis of an outer weight 15 may be perpendicular to the central axis of an inner weight 35 when the two axes form a 90 degree angle. In some embodiments, at least one of the central axes of the outer weight 15 and the inner weight 35 are centered upon a central axis of a outer resilient member 20. Different arrangements of the components of the vibration dampers may provide a wide range of choices to suit the vibration damper to different devices.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A firearm comprising:
a stock comprising a vibration damper;
the vibration damper comprising:
   a first resilient member and a second resilient member, each resilient member attached to the stock, each resilient member comprising a first material and a second material, each of said first and second materials being elastomeric, the first material defining a body of the resilient member, the body defining apertures therein and spokes extending between adjacent apertures, the second material occupying an entire cross-section of each aperture; and
   a mass supported by said first and second resilient members.

2. The firearm of claim 1, wherein said first and second resilient members are similar in shape but have opposite orientations.

3. The firearm of claim 1, wherein said first and second resilient members are symmetrical across an axis that bisects said vibration damper.

4. The firearm of claim 1, wherein said second material of each resilient member is disk shaped.

5. The firearm of claim 1, wherein said second material of each resilient member is oriented in a cavity defined in the first material and an outer surface of said second material is flush with an outer surface of said first material.

6. The firearm of claim 1, wherein said second material is transparent or semi-transparent.

7. The firearm of claim 1, wherein said second material comprises a polyurethane.

8. The firearm of claim 1, wherein said mass comprises a first weight, a resilient portion and an inner weight.

9. The firearm of claim 8, wherein said first weight comprises a cavity, said resilient portion and said inner weight oriented in the cavity.

10. The firearm of claim 8, wherein said resilient portion suspends said inner weight with respect to said first weight.

11. The firearm of claim 10, wherein said resilient portion comprises a first resilient portion and a second resilient portion, said first resilient portion symmetrical with said second resilient portion across a plane that bisects said first weight.

12. The firearm of claim 1, wherein said mass comprises a first weight, a first resilient portion, a second resilient portion, a first inner weight and a second inner weight, said first weight having a first cavity and a second cavity, said first resilient portion oriented in said first cavity and supporting said first inner weight, said second resilient portion oriented in said second cavity and supporting said second inner weight.

13. The firearm of claim 12, wherein said first resilient portion is symmetrical with said second resilient portion across a plane that bisects said first weight.

14. The firearm of claim 12, wherein said first inner weight is symmetrical with said second inner weight across a plane that bisects said first weight.

* * * * *